(12) United States Patent
Prabakaran et al.

(10) Patent No.: US 10,263,852 B2
(45) Date of Patent: Apr. 16, 2019

(54) NETWORK DATA MODEL MAPPING BASED ON MATCHING STRENGTH

(71) Applicant: CISCO TECHNOLOGY, INC., San Jose, CA (US)

(72) Inventors: Pavala Manikandaraja Prabakaran, Tamil Nadu (IN); Dhivya Pavala Manikandaraja, Tamil Nadu (IN); Japan Bhadreshkumar Patel, Gujarat (IN); Umakanth Srinivasan, Karnataka (IN); Suyog Subhash Belsare, Maharashtra (IN); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 15/386,535

(22) Filed: Dec. 21, 2016

(65) Prior Publication Data

US 2018/0176096 A1    Jun. 21, 2018

(51) Int. Cl.
*G06F 15/173* (2006.01)
*H04L 12/24* (2006.01)

(52) U.S. Cl.
CPC ............ *H04L 41/145* (2013.01); *H04L 41/12* (2013.01)

(58) Field of Classification Search
USPC .................................. 709/201, 223, 226, 245
See application file for complete search history.

(56) References Cited

U.S. PATENT DOCUMENTS

| | | | |
|---|---|---|---|
| 6,061,515 A | 5/2000 | Chang et al. | |
| 7,451,071 B2 | 11/2008 | Ferguson et al. | |
| 7,454,428 B2* | 11/2008 | Wang | G06F 17/30595 |
| 7,886,080 B2* | 2/2011 | Sajassi | H04L 12/4625 370/254 |
| 2002/0082820 A1* | 6/2002 | Ferguson | H04L 29/12009 703/22 |
| 2007/0058570 A1* | 3/2007 | Singh | H04L 41/0866 370/254 |
| 2015/0049634 A1* | 2/2015 | Levchuk | H04L 41/14 370/254 |
| 2015/0293946 A1* | 10/2015 | Fong | G06F 17/30294 707/811 |
| 2017/0048185 A1* | 2/2017 | Krueger | G06Q 50/01 |

OTHER PUBLICATIONS

"S-Match: an open source framework for matching lightweight on topologies", F. Giunchiglia et al., Semantic Web Journal, IOS Press, 2010.

\* cited by examiner

*Primary Examiner* — Liang Che A Wang
(74) *Attorney, Agent, or Firm* — Cindy Kaplan

(57) ABSTRACT

In one embodiment, a method includes processing network data models at a network device configured to operate in a network comprising one or more network components associated with one of the network data models, generating representations of the network data models, the representations comprising labels for elements in the network data models, comparing the labels associated with leaf nodes of the network data models to identify matching leaf nodes, comparing the labels associated with parent nodes of the matching leaf nodes to identify a strength of matching, and mapping at least two of the network data models at the network device based on the strength of matching for use in a network application. An apparatus and logic are also disclosed herein.

20 Claims, 5 Drawing Sheets

NETWORK DATA MODEL MAPPING BASED ON MATCHING STRENGTH

TECHNICAL FIELD

The present disclosure relates generally to communication networks, and more particularly, to mapping network data models.

BACKGROUND

The networking industry is converging on the adoption of model-driven APIs (Application Programming Interfaces) as the mechanism of choice for device manageability, especially in the context of SDN (Software Defined Networking) and NFV (Network Functions Virtualization). However, data model diversity continues to be a problem, with a plethora of competing models (e.g., vendor proprietary models, different standard body/forum models, customer specific models) available for the same technology or feature.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
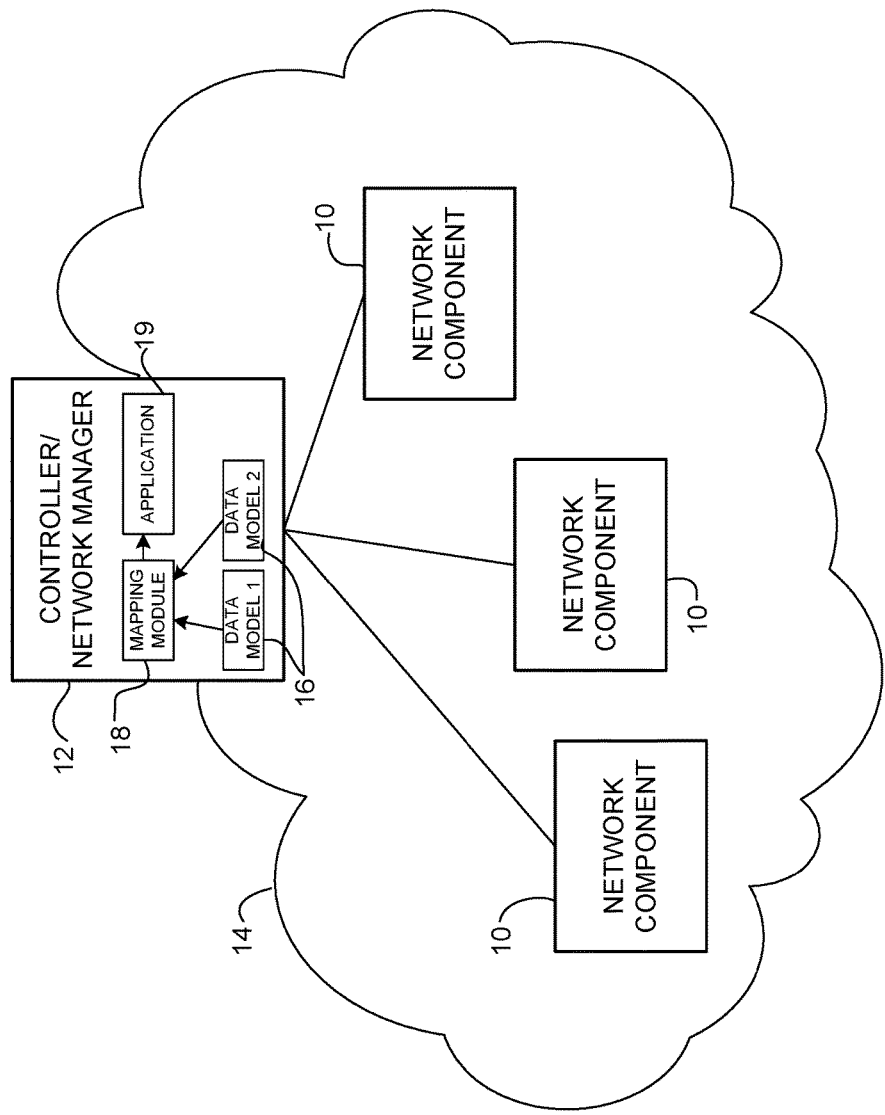
FIG. 1 illustrates an example of a network in which embodiments described herein may be implemented.

In one embodiment, a method generally comprises processing network data models at a network device configured to operate in a network comprising one or more network components associated with one or more of the network data models, generating representations of the network data models, the representations comprising labels for elements in the network data models, comparing the labels associated with leaf nodes of the network data models to identify matching leaf nodes, comparing the labels associated with parent nodes of the matching leaf nodes to identify a strength of matching, and mapping at least two of the network data models at the network device based on the strength of matching for use in a network application.

In another embodiment, an apparatus generally comprises an interface for receiving network data in a network comprising one or more network components associated with one or more network data models, a processor for generating representations of the network data models, the representations comprising labels for elements of the network data models, comparing the labels associated with leaf nodes of the network data models to identify matching leaf nodes, comparing the labels associated with parent nodes of the matching leaf nodes to identify a strength of matching, and mapping one or more of the network data models at the network device based on the strength of matching. The apparatus further comprises memory for storing a lexical database for use in comparing the labels.

In yet another embodiment, logic is encoded on one or more non-transitory computer readable media for execution and when executed by a processor operable to process network data models at a network device configured to operate in a network comprising one or more network components, each of the network components associated with one or more of the network data models, generate representations of the network data models, the representations comprising labels for elements of the network data models, compare the labels associated with leaf nodes of the network data models to identify matching leaf nodes, compare the labels associated with parent nodes of the matching leaf nodes to identify a strength of matching, and map at least two of the network data models at the network device based on the strength of matching.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network data models often evolve over time and may not maintain commonalities across platforms. Although standard bodies such as IETF (Internet Engineering Task Force) maintain common data models for most networking domain artefacts, almost all vendors have their own add-ons to the common data model. Because of this heterogeneity across devices, collecting the knowledge needed to manage and operate the network becomes a labor intensive and error prone process. While multiple network management and orchestration tools exist, network operation continues to be a high-touch task relying on highly trained staff.

Network data model diversity needs to be mediated in order for an application to utilize network data associated with the data model. In conventional network systems, this mediation relies on brute-force design-time manual mapping of the data models. For example, subject matter experts may identify mapping between objects by inspecting various models, and then implementing mapping in software code on a system. Performing the mapping between models manually is not a trivial task. In many instances, the models differ in the labels chosen for the same logical node, and the models often diverge in the organization of the node hierarchies. Thus, manual mapping between different data models is not easily achieved.

Semantic matching is a data science technique used to identify data that is semantically related. For any graph like structures such as XML (Extensible Markup Language) schema or ontologies, semantic matching is a function that identifies nodes in two structures that semantically correspond to one another. For example, data nodes for "TCP/IP" and "Protocol" have semantic similarity because of hyponymy relation between the two. Linguistic resources such as WordNet may be used to capture information that is semantically related.

Networking data models (e.g., YANG (Yet Another Next Generation) modules) are different from traditional documents targeted by semantic matching algorithms. Hence, attempting to use semantic matching as a means of detecting semantically equivalent nodes in two YANG models will yield poor results, with most true equivalencies going undetected. This is due to a number of reasons. For example, networking data models are "lightweight" ontologies where concepts are connected by general associations rather than formal semantic connections (e.g., containment, complement, etc.). Also, networking data models use domain specific language, with excessive use of acronyms (e.g. IP (Internet Protocol), OSPF (Open Shortest Path First), AS (Autonomous System), etc.) and other notational conventions (e.g., InterfaceDropCount, multi-area-id) in addition to specialized new senses for English words (e.g. Routing Area, Route Reflector, etc.). Moreover, network data models, even for the same technology, tend to differ significantly in their hierarchical organization. For example, data may be organized with different concepts chosen as the roots of the hierarchy (e.g., VRF (Virtual Routing and Forwarding) based vs. OSPF areas based organization). Furthermore, the depths of the hierarchies rarely match between models even for the same logical node.

The embodiments described herein provide for automatic mapping of device data models through semantic matching using prioritized and weighted matching strength thresholds. In one or more embodiments a first stage is applied that focuses on identifying all matching nodes in two models. A second stage is then applied that filters out any false positives that were identified in the first stage.

One or more embodiments may use an algorithm referred to as a "bottom-up approach" in which a first process focuses on identifying all matching nodes in two models (e.g., casting a wide net) and a second process resorts to filtering out any false positives that were identified in the first process (e.g., removing unwanted catch from the net).

Referring now to the drawings, and first to FIG. 1, an example of a network in which embodiments described herein may be implemented is shown. The embodiments operate in the context of a data communication network including multiple network devices (components, elements, nodes). For simplification, only a small number of network devices are shown. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the example shown in FIG. 1, the network includes a plurality of network components (devices, elements) 10 in communication with a network device 12 (e.g., controller, network management device). The controller 12 may be in communication with any number of network components 10 or networks 14. Data flow paths between the network components 10 and controller 12 may include any number or type of intermediate nodes (e.g., routers, switches, gateways, or other network devices) and communication links, which facilitate passage of data between the devices. Network traffic may traverse one or more networks 14.

The network component 10 may comprise, for example, a router, switch, server, host, endpoint, gateway, client device, mobile device, sensor, IoT (Internet of Things) device, or any other device, element, or component operable to communicate or provide data within a networking environment. Each network component 10 comprises features, parameters, characteristics, configuration parameters, functional definitions, and the like, associated with a data model 16. The data model 16 may describe, for example, how data is represented and accessed and define the structure, syntax, and semantics of the data. The data model 16 may be defined, for example, by a data modeling language such as YANG, which is used to model configuration and state data. The data model 16 may comprise, for example, a vendor proprietary model, standard model, customer specific model, model associated with network operating system or type of device, or any other model for use in identifying one or more parameters, characteristics, operating mode, or other feature of the network component 10. The data model 16 may be, for example, in the form of an MIB (Management Information Base), YANG model, CLI (Command Line Interface) output format, XSD (XML Schema Definition), and the like. The controller 12 receives information from the network components 10 regarding their configuration, functions, capability, characteristics, parameters, state, mode, etc., which may be associated with or defined based on one or more data models 16.

The network device 12 may comprise a controller (e.g., SDN (Software Defined Networking) controller), network manager (e.g., NMS (Network Management Station)), or any other network device operable to communicate with a plurality of network components 10 and process network data (e.g., data associated with data models 16) received from the network components. The controller 12 may comprise, for example, an ODL (OpenDaylight) controller (e.g., Service Provider (SP) Software Defined Networking (SDN) controller) or an APIC (Application Policy Infrastructure Controller). The controller or network manager 12 may operate as a stand-alone device or on two or more network devices or network components 10, or in a cloud environment.

The network device 12 comprises a mapping module 18 operable to automatically map heterogeneous data models 16 for use by an application 19, as described in detail below. The mapping module 18 may operate, for example, as embedded manageability or controller software. The application 19 may comprise any type of application or API operable to perform one or more functions based on data received from the network components 10. The mapping module 18 decouples the application 19 from the underlying data received from diverse data models 16 so that the application can operate in environments comprising different types of equipment (e.g., different manufacturers, operating systems, etc.). In the example shown in FIG. 1, the mapping module 18 and application 19 reside on the same network device 12, however, the application 19 may run on another network device in communication with the controller 12, one of the network components 10, or any other network device.

It is to be understood that the network shown in FIG. 1 and described above is only an example and the embodiments described herein may be implemented in networks comprising different network topologies or network devices without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of core networks. Moreover, the topology illustrated in FIG. 1 and described above is readily scalable and may accommodate a large number of components, as well as more complicated arrangements and configurations. Thus, network nodes (elements, devices) may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communication.

Figure 2:
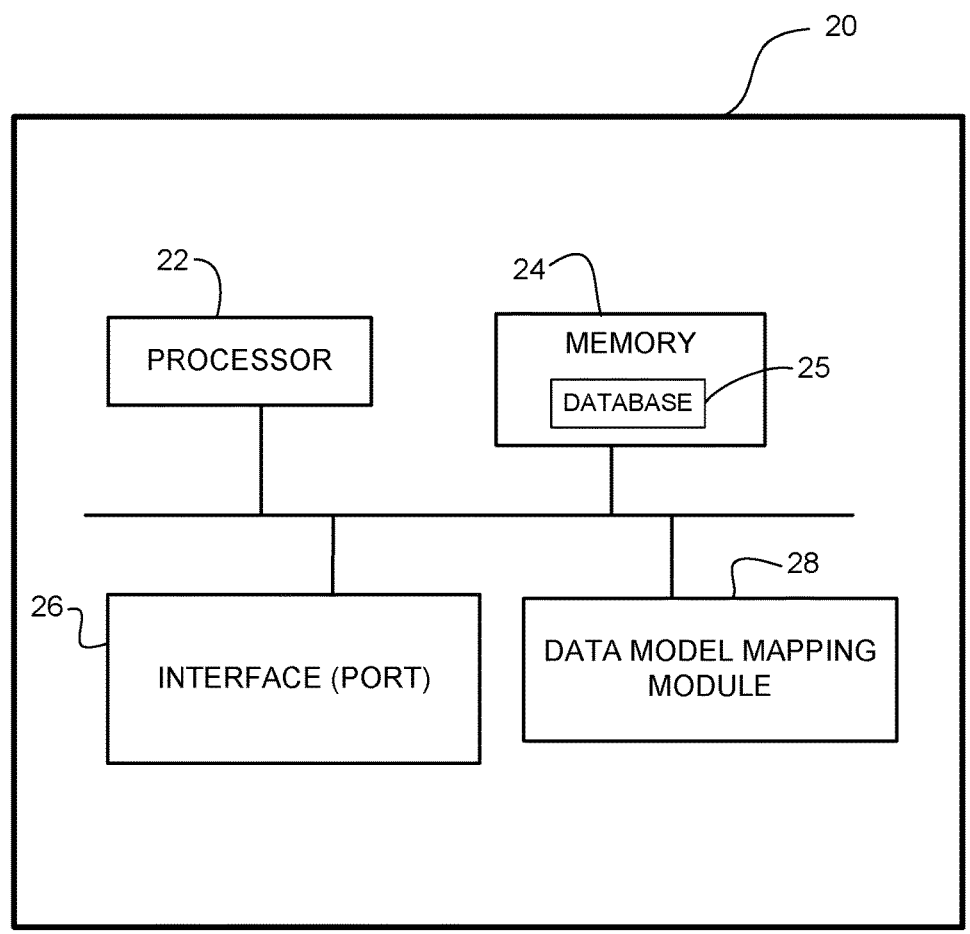
FIG. 2 depicts an example of a network device useful in implementing embodiments described herein.

FIG. 2 illustrates an example of a network device 20 (e.g., controller/network manager 12 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and mapping module 28 (e.g., logic, software, firmware).

Memory 24 may be a volatile memory or non-volatile storage, which stores various applications, operating systems, modules, and data for execution and use by the processor 22. For example, mapping components (e.g., module, code, logic, software, firmware, etc.) may be stored in memory 24. Memory 24 may also include one or more databases 25 (e.g., lexical database, database comprising data models, database comprising configuration data from network components, management information base). The network device 20 may include any number of memory components.

Logic may be encoded in one or more tangible media for execution by the processor 22. For example, the processor 22 may execute codes stored in a computer-readable medium such as memory 24 to perform the processes described below with respect to FIGS. 3 and 4. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium.

The network interface 26 may comprise any number of interfaces (linecards, ports) for receiving data or transmitting data to other devices. For example, the network interface 26 may be configured for receiving data from network components 10 associated with the data models, or transmitting mapping results from the mapping module 18 for use by application 19. The network interface 26 may be configured to transmit or receive data using a variety of different communication protocols. The network interface 26 may include, for example, an Ethernet interface for connection to a computer or network. The interface may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, processors, devices, components, modules, or elements operable to facilitate the capabilities described herein.

With the ability to build knowledge systems from domain specific ontologies, ontology matching techniques may be leveraged to identify the semantic similarities across various data models 16 in a networking environment. Once semantic matching is leveraged for data model mapping, a wider set of applicable use cases is opened up, including, for example, automatic translation of configuration data across platforms for a common networking function (e.g., automatic translation of OSPF configuration data from a vendor platform-specific model to common IETF model). It is to be understood that the use cases described herein are only examples and that the embodiments may be implemented for other use cases without departing from the scope of the embodiments.

As described below, semantic matching may be used to map the data models 16 and address the heterogeneity issue in the networking domain. Semantic matching is a technique that operates on tree (graph)-like structures and relies on semantic information to identify nodes that are semantically related. Data within the data models may be hierarchically arranged under nodes (also referred to as elements). The data model may comprise nodes in a schema tree that can be instantiated in a data tree. The nodes may be described using natural language labels. A representation comprising labels, a description, and a hierarchical organization for each element, may be generated for each network data model.

Figure 3:
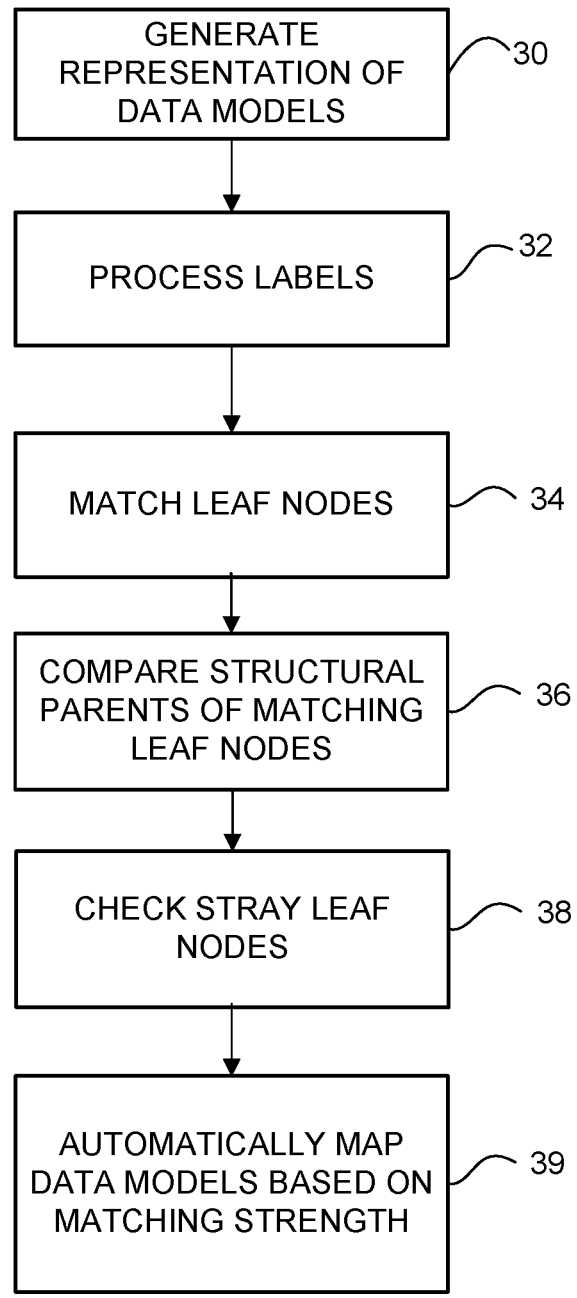
FIG. 3 is a flowchart illustrating an overview of a process for mapping of network data models, in accordance with one embodiment.

FIG. 3 is a flowchart illustrating an overview of a process for mapping network data models, in accordance with one embodiment. The data models are processed at a network device (e.g., controller, network management station 12 in FIG. 1) operating in a network comprising a plurality of network components 10. The data models may be, for example, loaded by a network operator or pre-installed at the network device. Each of the network components 10 is associated with at least one of the data models 16. The network device 12 performs semantic matching for at least two of the data models 16. For example, the network device 12 may run a series of algorithms and produce as output a semantic analysis of nodes (elements) of the two data models 16. In one embodiment, the semantic matching includes generating a uniform, distilled, representation of the data models (step 30). The representation may comprise labels for elements in the network data models. This may be performed, for example, at a model adapter configured to parse the device data models (e.g., YANG module, XSD, etc.) and generate a representation of the model. The distilled representation captures labels associated with each element in the model, a description of each element, and the elements' hierarchical organization.

Labels may then be processed utilizing label computation algorithms for notational conventions used in the network data models (step 32). Label computation algorithms may be implemented utilizing tokenization and lemmatization support for networking notational conventions. For example, the tokenization process may be configured to handle camel case, Pascal case, and hyphenated words, as described below. The lemmatization process may be configured to handle multiword keywords. Support for hyphenated and other types of words or phrases may be provided in a lexical database.

A leaf node matching process may then be performed by attempting to capture all possible valid matches by matching leaf nodes (step 34). In one embodiment, only the labels associated with the leaf nodes of the input models are examined. Tokens associated with labels of the leaf nodes may be analyzed for semantic equivalency, as described below with respect to FIG. 4. The output of the leaf node matcher is a collection of all possible valid matches along with false positives. Since this process attempts to capture all possible valid matches, false positives may be included. The leaf nodes that do not yield any matches at all from this step may be accommodated in the stray leaf accommodator (step 38) described below.

For all pairs of leaf nodes that produce equivalent mappings at step 34, the labels of the structural parents may be examined for every two matching nodes (step 36). This step may be used to identify valid matches by computing the matching strength between structural parent nodes. For every such pair of nodes, the strength of matching may be found by computing the number of semantically equivalent tokens between the two structures. In one example, stronger weight is given to the tokens matching in the immediate structural parent nodes as compared to the rest of the tokens in the hierarchy. This is to reflect the stronger semantic significance of this node compared to higher ancestor nodes in the hierarchy. In one embodiment, the following formula may be used to compute the matching strength in this step:

M×(# of tokens matching between the immediate structural parent nodes)+(# of tokens matching between the remaining structural parent nodes)

In one example, M may be set equal to 2 (or any other constant). In this example, the tokens of leaf nodes are not included in the computation.

The following provides an example utilizing the process described above for comparing structural parents of matching leaf nodes. In this example, A/B/C/D from Model 1 is to be matched with X/Y/Z from Model 2. Leaf nodes D and Z were found to match in step 34. Nodes C and Y are immediate structural parent nodes of D and Z, respectively. In this example, 2 tokens of C match with Y, 3 tokens of A match with X, and a match was not found between B and X or Y. The strength of the match may be computed as:

[2*(number of tokens matching between C and Y)+ (number of tokens matching between A and X]=[2*2+3]=7.

The results may be sorted based on the matching strength. Nodes with the highest N matching strengths are added to the list of potential matches. In one example, N may be set equal to 2 (or any other constant). In one embodiment, once a structural parent matches that of a corresponding node, it is no longer considered for matching with other nodes. Also, it may be noted that the matching algorithm described above declares equivalency based on a threshold of the matching number of tokens, as described further below with respect to FIG. 4. In one example, a threshold of 50% (or any other threshold) may be used.

As previously noted, stray leaf nodes may optionally be checked (step 38). For example, an attempt may be made to identify any potential matches that were missed for all leaf nodes in which there was not found a valid match in the above steps. All stray leaf nodes may be analyzed to try and identify any potential matches that were missed. In one embodiment, the logic for this step may be the same as the structural-level strength-based sorter described above with respect to step 36, except that the tokens of the label of the leaf may also be included, along with the tokens of the structural parent, to match and sort based on the matching strength.

The data models 16 may then be automatically mapped at the network device 12 based on the matching results for use in a network application 19 (step 39). The set of identified matches in the analysis may be used to automatically map a node in the first model to a node in the second model at run-time, thereby mediating the differences between the network data models automatically. The design time effort is limited to populating the lexical database with the domain terminology, which is an effort that only has to be done once, independent of the number of data models 16. This allows the application 19 to use any device model 16 of their choosing, and the system is able to map the nodes to their equivalencies when communicating with the network components 10 in their native model.

Figure 4:
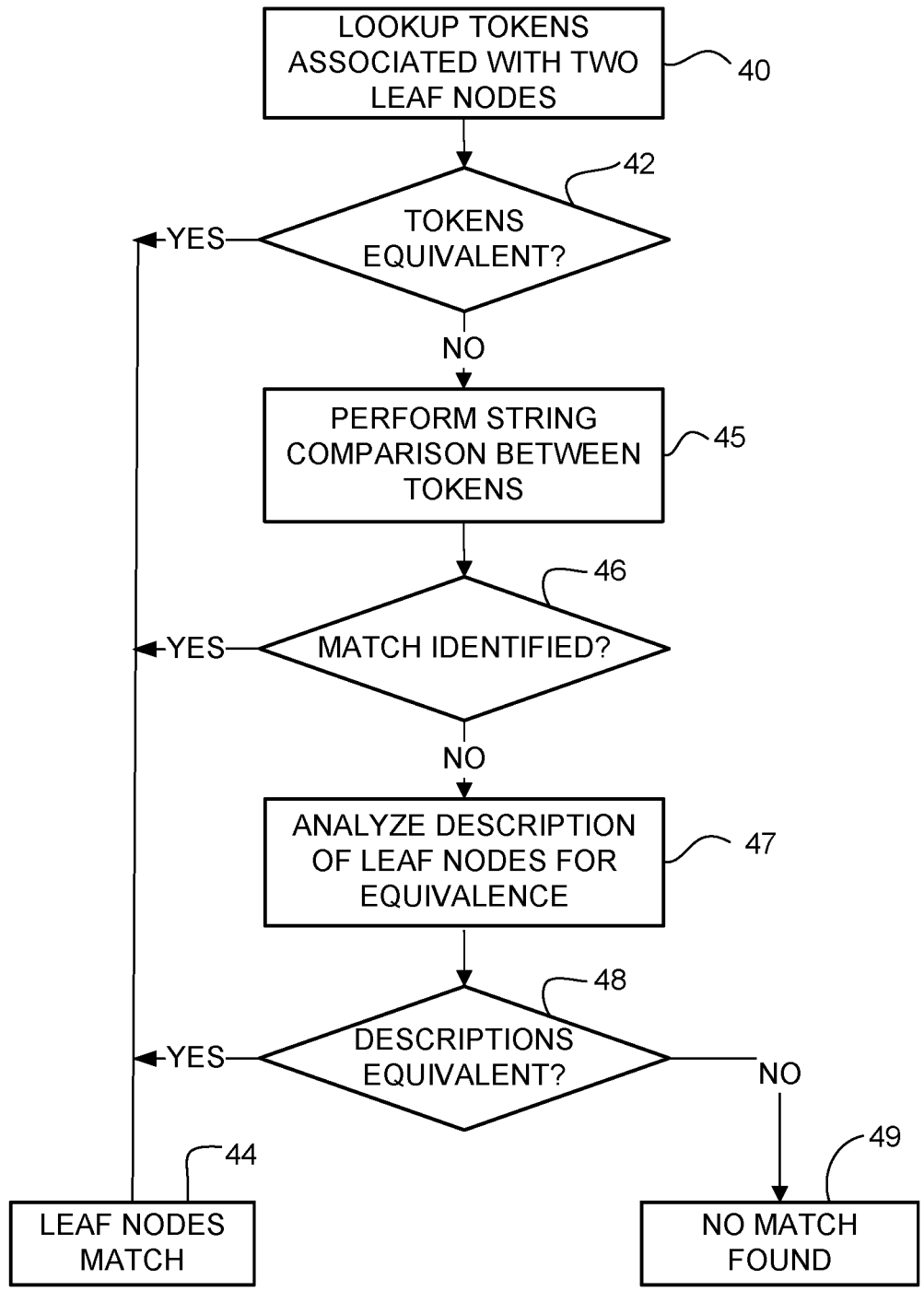
FIG. 4 is a flowchart illustrating details of a leaf node matching process of the flowchart of FIG. 3, in accordance with one embodiment.

FIG. 4 is a flowchart illustrating details of a process for leaf node matching (step 34 in FIG. 3), in accordance with one embodiment. As previously described, the leaf node matcher receives output from a label computation algorithm. In one example, a tokenizer implements the element label computation algorithm. The tokens associated with the labels of the leaf nodes are analyzed for semantic equivalency. At step 40, a lookup is performed in which tokens associated with the two leaf nodes are looked up in WordNet (or similar database) to see if they are equivalent. In one embodiment, gloss based matching is performed using a glossary from WordNet (or other digital dictionary) for comparison. If they are equivalent, a leaf node match is found (steps 42 and 44).

If the tokens are not equivalent, a string comparison is performed (e.g., syntactic match) between the tokens (step 45). Two leafs may be declared to be equivalent if a defined percentage threshold of the tokens of the labels of the leaf nodes match. In one embodiment, a threshold of sixty percent may be used. It is to be understood that this is only an example and that other thresholds (e.g., more or less than 60%) may be used. In one embodiment, matching strength for determining equivalence of leaf nodes in step 45 may be computed as follows:

Matching Strength=(Number of Tokens Matching Between Two Leaf Nodes)/(Number of Tokens in the Longer Leaf Node)*100

If a match is identified, the leaf nodes are identified as matching (steps 46 and 44).

If no match is found, the descriptions of both leaf nodes are analyzed for equivalence (step 47). The descriptions may be picked from input YANG files by the model adapter, for example. When comparing descriptions in gloss based matching, a percentage threshold similar as used in step 45 may be used to declare a match. In one embodiment, a threshold of sixty percent (or any other threshold) may be used. In one example, matching strength for use in determining equivalence may be computed as follows:

Matching Strength=(Number of Meaningful Words Matching Between Two Descriptions)/(Number of Meaningful Words in the Longer Leaf Node) *100

In this example, meaningful words may include all words in the description that are not identified as meaningless words (e.g., prepositions, conjunctions, articles, etc.). If the descriptions are found to be equivalent, a leaf node match is identified (steps 48 and 44).

If the leaf nodes are not found to be equivalent, the leaf nodes do not match (steps 48 and 49). As described above with respect to FIG. 3, stray leaf nodes that were not found to have a match may be checked again for matching by computing the matching strength between the entire pair of structures (step 38 in FIG. 3).

It is to be understood that the processes shown in FIGS. 3 and 4, and described above are only examples and that steps may be added, deleted, combined, or modified without departing from the scope of the embodiments.

Figure 5:
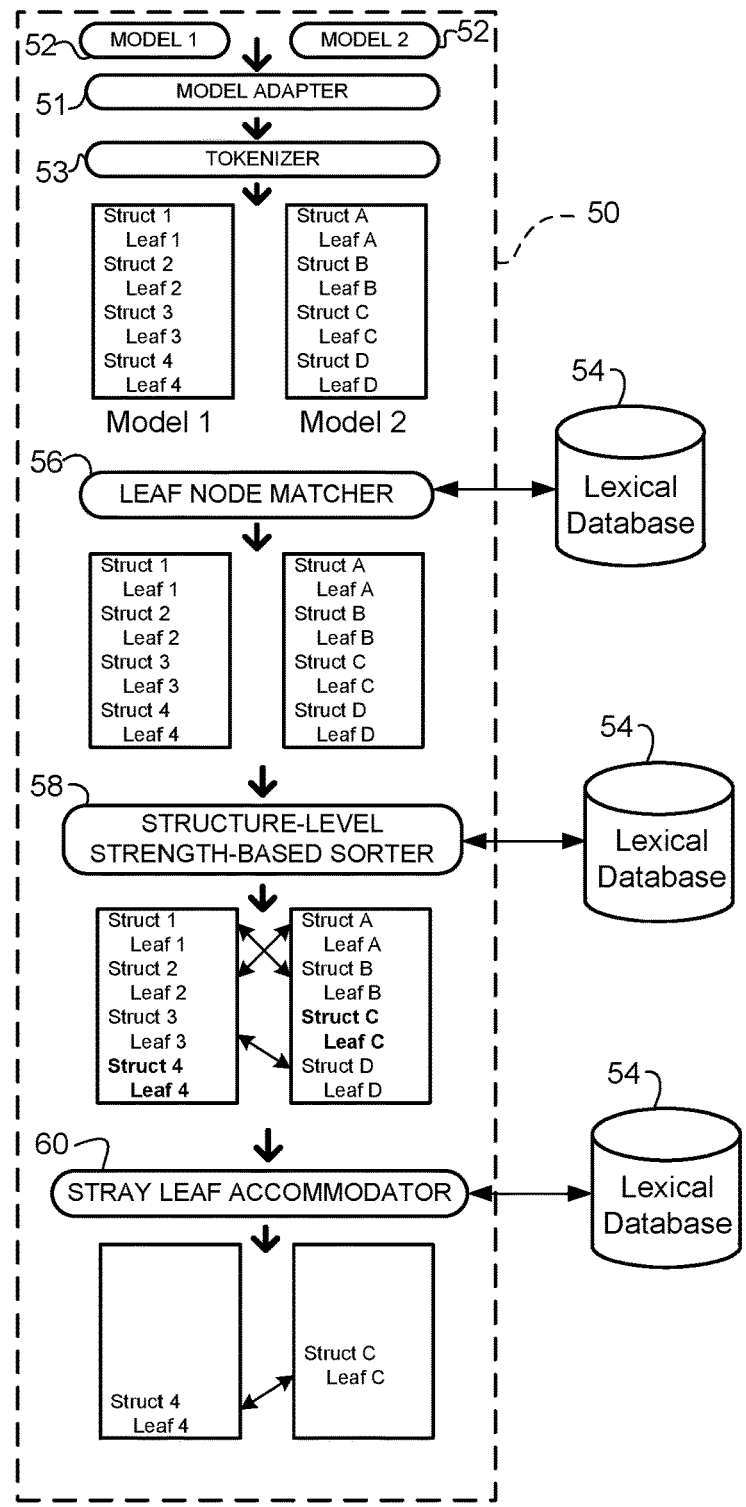
FIG. 5 is a block diagram illustrating details of a data mapping module of FIG. 1, in accordance with one embodiment.

FIG. 5 illustrates mapping of data models 52 (model 1, model 2) at model mapper 50, in accordance with one embodiment. Model 1 comprises structural parent nodes 1, 2, 3, 4 and leaf nodes 1, 2, 3, 4. Model 2 comprises structural parent nodes A, B, C, D, and leaf nodes A, B, C, D. The model mapper 50 uses data from a lexical database 54, which may comprise domain terminology generated at design time. The model mapper 50 comprises a pipeline of functions that may be logically organized into stages comprising a model adapter 51, tokenizer 53, leaf node matcher 56, structure-level strength-based sorter (false positive reducer) 58, and stray leaf accommodator 60.

The model adaptor 51 parses the device data model (e.g. YANG module, XSD (XML Schema Definition)) and generates a uniform, distilled, representation of the model. This distilled representation captures the labels associated with every element in the model, the description of each element, and the elements' hierarchical organization. The distilled representation is passed to the tokenizer stage 53.

The tokenizer 53 implements element label computation algorithms configured for notational conventions used in network data models. This stage includes tokenization and lemmatization processes modified to account for common networking notational conventions. More specifically, this stage of the process addresses the fact that network data models use domain specific language, with excessive use of acronyms and notational conventions in addition to specialized new senses for English words. For example, the tokenization process may be configured to handle hyphenated words and camel case and Pascal case keywords. This is important because YANG models make heavy use of hyphenated and camel case words. The lemmatization process may be configured to handle multiword keywords. For example, for words such as four-byte-as, instead of breaking this down to three individual keywords (four, byte, and as), they need to be treated as a single keyword for proper context establishment.

The output of the tokenizer 53 is fed to the leaf node matcher 56, which examines the labels associated with the leaf nodes of the input models 52. The tokens associated with the labels of the leaf nodes are analyzed for semantic equivalency, as described above with respect to FIG. 4. The output of the leaf node matcher 56 is a collection of all possible valid matches that could be caught by the leaf node matcher, along with false positives. The output of the leaf node matcher 56 is fed to the structure-level strength-based sorter 58.

The structure-level strength-based sorter 58 examines the labels of the structural parents of every two matching nodes for all pairs of leaf nodes that produced equivalent mappings by the leaf node matcher 56. For every such pair of nodes, the strength of matching is calculated by computing the number of semantically equivalent tokens between the two structures, as described above with respect to FIG. 3. In the example shown in FIG. 5, there are matches identified between Struct 1/Leaf 1 and Struct B/Leaf B, Struct 2/Leaf 2 and Struct A/Leaf A, and between Struct 3/Leaf 3 and Struct D/Leaf D.

All leaf nodes that did not find a valid match in the previous stages may be provided to the stray leaf accommodator 60. The stray leaf accommodator 60 attempts to identify any potential matches that were missed, as previously described with respect to FIG. 3. In the example shown in FIG. 5, the stray leaf accommodator 60 identifies a match found between Struct 4/Leaf 4 and Struct C/Leaf C.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    processing network data models at a network device configured to operate in a network comprising one or more network components associated with one or more of the network data models;
    generating representations of the network data models, said representations comprising labels for elements in the network data models;
    comparing said labels associated with leaf nodes of the network data models to identify matching leaf nodes;
    comparing said labels associated with parent nodes of said matching leaf nodes to identify a strength of matching using prioritized and weighted matching strength thresholds, wherein comparing said labels associated with the leaf nodes comprises performing a lookup of tokens associated with the leaf nodes; and
    mapping at least two of the network data models at a mapping module at the network device based, at least in part, on said strength of matching for use in a network application, wherein the mapping module decouples the network application from data received from diverse data models.

2. The method of claim 1 wherein said representation comprises a description of each of the leaf nodes and parent nodes and a hierarchical organization of the leaf nodes and parent nodes.

3. The method of claim 1 further comprising performing structural matching on parent nodes.

4. The method of claim 1 wherein comparing said labels comprises determining their semantic equivalency or non-equivalency by consulting a lexical database.

5. The method of claim 1 wherein comparing said labels comprises a syntactic comparison and gloss-based matching.

6. The method of claim 1 wherein said lookup utilizes a glossary from a digital dictionary.

7. The method of claim 1 further comprising performing a string comparison between said tokens and analyzing a description of the leaf nodes for equivalence.

8. The method of claim 1 wherein comparing said labels comprises computing a matching strength and applying a matching strength threshold to identify matching labels.

9. The method of claim 1 wherein said strength of matching is weighted for matching in immediate parent nodes.

10. An apparatus comprising:
    an interface for receiving network data in a network comprising one or more network components associated with one or more network data models;
    a processor for generating representations of the network data models, said representations comprising labels for elements in the network data models, comparing said labels associated with leaf nodes of the network data models to identify matching leaf nodes, comparing said labels associated with parent nodes of said matching leaf nodes to identify a strength of matching using prioritized and weighted matching strength thresholds, and mapping at least two of the network data models at a mapping module at the network device based on said strength of matching; and memory for storing a lexical database for use in comparing said labels;

wherein the mapping module decouples the network application from data received from diverse data models and wherein comparing said labels associated with the leaf nodes comprises performing a lookup of tokens associated with the leaf nodes.

11. The apparatus of claim 10 wherein the lexical database comprises domain terminology stored in the database for use by the processor at run-time.

12. The apparatus of claim 10 wherein the apparatus comprises a controller or a network management device.

13. The apparatus of claim 10 wherein the processor is further configured to perform structural matching on parent nodes.

14. The apparatus of claim 10 wherein comparing said labels comprises determining their semantic equivalency or non-equivalency by consulting a lexical database.

15. The apparatus of claim 10 wherein said representation comprises a description of each of the leaf nodes and parent nodes and a hierarchical organization of the leaf nodes and parent nodes.

16. The apparatus of claim 10 wherein the network data models comprise YANG (Yet Another Next Generation) data models.

17. The apparatus of claim 10 wherein said strength of matching is weighted for matching in immediate parent nodes.

18. Logic encoded on one or more non-transitory computer readable media for execution and when executed by a processor operable to:

process network data models at a network device configured to operate in a network comprising one or more network components associated with one or more of the network data models;

generate representations of the network data models, said representations comprising labels for elements in the network data models;

compare said labels associated with leaf nodes of the network data models to identify matching leaf nodes, wherein comparing said labels associated with the leaf nodes comprises performing a lookup of tokens associated with the leaf nodes;

compare said labels associated with parent nodes of said matching leaf nodes to identify a strength of matching using prioritized and weighted matching strength thresholds; and map at least two of the network data models at a mapping module at the network device based on said strength of matching;

wherein the mapping module decouples the network application from data received from diverse data models.

19. The logic of claim 18 wherein comparing said labels associated with the leaf nodes comprises performing a string comparison between said tokens associated with the leaf nodes and computing a matching strength.

20. The logic of claim 18 wherein comparing said labels associated with the leaf nodes comprises analyzing a description of the leaf nodes for equivalence and computing a matching strength.

* * * * *